(12) United States Patent
Albertini et al.

(10) Patent No.: US 10,688,428 B2
(45) Date of Patent: Jun. 23, 2020

(54) HOUSING AND FILTER SYSTEM HAVING A HOUSING

(71) Applicant: Mann+Hummel GMBH, Ludwigsburg (DE)

(72) Inventors: Gilberto Albertini, Indaiatuba (BR); Bruno Cesar Proenca Ribeiro, Indaiatuba (BR); Fabio Faria de Souza, Indaiatuba (BR); Carlos Alberto da Silva, Indaiatuba (BR)

(73) Assignee: MANN+HUMMEL GmbH, Ludwigsburg (DE)

( * ) Notice: Subject to any disclaimer, the term of this patent is extended or adjusted under 35 U.S.C. 154(b) by 2 days.

(21) Appl. No.: 15/832,058

(22) Filed: Dec. 5, 2017

(65) Prior Publication Data

US 2019/0168149 A1    Jun. 6, 2019

(51) Int. Cl.
| | | |
|---|---|---|
| *F02M 35/024* | (2006.01) | |
| *B01D 46/00* | (2006.01) | |
| *F02M 35/02* | (2006.01) | |
| *B01D 46/24* | (2006.01) | |

(52) U.S. Cl.
CPC ..... *B01D 46/0004* (2013.01); *B01D 46/0005* (2013.01); *B01D 46/0046* (2013.01); *B01D 46/2411* (2013.01); *F02M 35/0203* (2013.01); *F02M 35/024* (2013.01); *B01D 2201/4015* (2013.01); *B01D 2201/4076* (2013.01); *B01D 2265/021* (2013.01); *B01D 2265/022* (2013.01); *B01D 2265/027* (2013.01); *B01D 2265/028* (2013.01)

(58) Field of Classification Search
CPC ............ B01D 46/0004; B01D 46/0005; B01D 46/0046; B01D 2201/4076; B01D 2201/4015; B01D 2265/028; B01D 2265/021; B01D 2265/022; F02M 35/0203; F02M 35/024
USPC ...... 55/385.3, 498, 493, 502, 423, 521, 320, 55/337, 428, 466, 476, 503, 478, 480, 55/481, 504; 95/273; 96/189; 210/282, 210/DIG. 17; 220/4.21, 4.24, 293, 298, 220/300; 123/198 E
See application file for complete search history.

(56) References Cited

U.S. PATENT DOCUMENTS

| | | | |
|---|---|---|---|
| 4,215,790 A | 8/1980 | Ribble et al. | |
| 4,965,955 A | 10/1990 | Campbell | |
| 6,139,607 A | 10/2000 | Coulonvaux | |
| 6,402,798 B1 | 6/2002 | Kallsen et al. | |
| 6,436,162 B1 | 8/2002 | Wake et al. | |
| 7,442,222 B2 * | 10/2008 | Dworatzek | ........ B01D 46/0001 220/293 |
| 7,850,756 B1 | 12/2010 | Senetar | |

(Continued)

*Primary Examiner* — Minh Chau T Pham (57) ABSTRACT

A housing (110) having a housing body (112), connected to a mating housing cover (114) are arranged along a longitudinal axis (A). The housing (110) receives a filter element (10). A push-twist structure (120) is provided on the housing body and the housing cover connecting the housing body (112) and housing cover (114) by way of a push-twist mount. The push-twist structure (120) having mating push-twist elements (122, 124) arranged on the housing body (112) and the housing cover (114). An anti-rotation lock structure (160) is provided for securing the push-twist structure (120) in its closed position in an anti-rotation lock manner.

11 Claims, 7 Drawing Sheets

(56) References Cited

U.S. PATENT DOCUMENTS

| | | | |
|---|---|---|---|
| 8,216,335 B2* | 7/2012 | Scott | B01D 46/0005 |
| | | | 55/385.3 |
| 2003/0226337 A1 | 12/2003 | Zaffetti | |
| 2006/0121768 A1 | 6/2006 | Dworatzek et al. | |
| 2012/0047856 A1* | 3/2012 | Khami | B01D 46/0002 |
| | | | 55/385.3 |
| 2013/0042587 A1* | 2/2013 | Traub | B01D 46/0004 |
| | | | 55/385.3 |

* cited by examiner

HOUSING AND FILTER SYSTEM HAVING A HOUSING

TECHNICAL FIELD

Disclosed is a housing and a filter system for filtering of a fluid, in particular for air filter systems of combustion engines, in particular for vehicles.

PRIOR ART

EP1661614B1 discloses a filter housing, featuring a first and a second housing component, where the first housing component and the second housing component are detachably connectable to each other via a rotating rotary relative movement. Mating locking devices are provided which are attached to the housing components. A first number of locking devices feature means to maintain the connection between the housing components and a second number of locking devices feature means to adjust the torque for opening and means to adjust the torque for closing the housing. The second number of locking devices are featuring mating sections which are arranged parallel to the rotating torsion direction as well as torque sections which are at an acute angle to these sections in such a way that by selecting the respective angle the torque for opening the connection can be adjusted independently of the torque for closing the connection.

SUMMARY

It is an object of the present disclosure to provide a housing and a filter system with a housing which is suitable for regions with limited mounting space.

This object is achieved by a housing with a push-twist structure and an anti-rotation lock structure. The anti-rotation lock structure comprises a clip element provided for connecting to an anchor portion. The clip element and the anchor portion are configured so that the clip element is to be mounted to the anchor portion in a predominantly circumferential mounting direction.

The other claims, the description and the drawings describe advantageous embodiments of the disclosure.

According to a first aspect of the disclosure a housing, in particular for receiving a filter element for filtering of a fluid, comprising along a longitudinal axis, a housing body, a mating housing cover, wherein a push-twist structure is provided for connecting the housing body and the housing cover by way of a push-twist mount, the push-twist structure having mating push-twist elements on the housing body and the housing cover, wherein an anti-rotation lock structure is provided for securing the push-twist structure in its closed position in an anti-rotation lock manner, wherein the anti-rotation lock structure provides at least one anchor portion arranged along the circumference of the outer one of the housing body and the housing cover, wherein a clip element is provided for connecting to the anchor portion, and wherein the clip element and the anchor portion are configured so that the clip element is to be mounted to the anchor portion in a predominantly circumferential mounting direction.

The housing may be provided for receiving an exchangeable air filter element, for instance. Advantageously a single clip element is sufficient to mutually lock the housing body and the housing cover in an anti-rotation manner. The push-twist structure may be configured to carry load in axial direction, whereas the anti-rotation lock structure only needs to prevent the housing body and the housing cover to move in circumferential direction. In particular, the push-twist mount may be a bayonet mount. The clip element can be mounted in a compact way. Even in a very close installation space the housing can be opened and closed in a comfortable manner. In particular, the clip element may be a separate part which is only connected to the housing when the anti-rotation lock structure needs to be locked. For removing the housing cover from the housing body the clip element can by removed completely from the housing providing a better handling of the housing cover in narrow spaces.

According to an advantageous embodiment a first set of twist-push-twist elements of the push-twist structure may include at least one catching detent. Advantageously, a bayonet-type connection may be employed. A multitude of catching detents may be provided on the housing body or the mating housing cover. Optionally, catching detents may be arranged on each of the housing body and the mating housing cover.

According to an advantageous embodiment a second set of push-twist elements may include at least one catching receptacle for receiving at least one of the catching detents. In particular, the at least one catching receptacle may be configured as an axial notch protruding in radial direction from the surface shell of the outer one of the housing body and the housing cover. The catching receptacle configured as a notch may have an opening for axially inserting the catching detent which has at least a circumferential extension as the overall circumferential extension of the catching detent. Load can be transferred from the catching detent to its catching receptacle.

According to an advantageous embodiment the at least one catching receptacle may provide an opening in circumferential direction so that a leg of the catching detent may protrude in circumferential direction when the push-twist structure is in its locked state. An easy optical identification whether or not the push-twist connection between housing body and the housing cover is established is achieved. Alternatively, the catching detent may be completely covered by the catching receptacle.

According to an advantageous embodiment the anti-rotation lock structure may comprise at least one rib extending in axial direction and being arranged at the inner one of the housing body and the housing cover, the at least one rib being arranged in a distance to the at least one catching detent of the push-twist structure on the circumference of the inner one of the housing body and the housing cover. In particular, two or more ribs and catching detents may be alternatingly arranged along the circumference of the inner one of the housing body and the housing cover. This allows for multiple mounting positions for the clip element. The clip element can be mounted at an easily accessible position. The housing cover does not need to be positioned in a specific positional arrangement for attaching the clip element.

According to an advantageous embodiment the clip element may be provided with a catching portion for negotiating with a rib of the anti-rotation lock structure and a lever portion for negotiating with one of the anchor portions of the anti-rotation lock structure. The rib is attached to the inner one of housing body and housing cover and the anchor portions are attached to the outer one of housing body and housing cover so that an easy anti-rotation lock is possible by way of the clip element being attached to both rib and anchor position.

According to an advantageous embodiment the outer one of the housing body and the housing cover may provide a rim having at least one sequence in circumferential direction of an axial cut-out portion followed by one anchor portion followed by one catching receptacle. In particular, at least two sequences of an axial cut-out portion followed by one anchor portion followed by one catching receptacle are provided in circumferential direction. The rib may be positioned in a way to be accessible through the cut-out portion. The rib may be positioned in a way that with the push-twist connection established, the rib may contact a side of the cut-out portion. The clip element can be mounted at an easily accessible position. The housing cover does not need to be positioned in a specific correct positional arrangement for attaching the clip element to the rib and the anchor position.

According to an advantageous embodiment the anchor portion may be made in one piece with the surface shell of the outer one of the housing body and the housing cover. The housing may be made of plastic material, for instance, manufactured by a molding process.

According to a further aspect of the disclosure, a filter system having a housing, the housing being configured for receiving a filter element for filtering of a fluid, comprising along a longitudinal axis, a housing body, a mating housing cover, a fluid outlet for evacuating the filtered fluid from the housing, a fluid inlet for feeding the raw fluid into the housing. A push-twist structure is provided for connecting the housing body and the housing cover, the push-twist structure having mating push-twist elements on the housing body and the housing cover. An anti-rotation lock structure is provided for securing the push-twist structure in its closed position in an anti-rotation lock manner. The anti-rotation lock structure provides at least one anchor portion arranged along the circumference of the outer one of the housing body and the housing cover. A clip element is provided for connecting to the anchor portion. The clip element and the anchor portions are configured so that the clip element is to be mounted to the anchor portion in a predominantly circumferential mounting direction.

Advantageously a single clip element is sufficient to mutually lock the housing body and the housing cover in an anti-rotation manner. The push-twist structure may be configured to carry load in axial direction, whereas the anti-rotation lock structure only needs to prevent the housing body and the housing cover to move in circumferential direction. The clip element can be mounted in a compact way. Even in a very close installation space the housing can be opened and closed in a comfortable manner. In particular, the clip element may be a separate part which is only connected to the housing when the anti-rotation lock structure needs to be locked. For removing the housing cover from the housing body the clip element can by removed completely from the housing providing a better handling of the housing cover in narrow spaces.

According to an advantageous embodiment the fluid inlet may be accommodated in the housing cover. Advantageously, the fluid outlet may be accommodated in the housing body. Optionally, the fluid inlet may be configured in a manner coaxial to the housing, for instance. Other arrangements and positions of inlet and outlet may be possible.

BRIEF DESCRIPTION OF THE DRAWINGS

The present disclosure together with the above-mentioned and other objects and advantages may best be understood from the following detailed description of the embodiments, but not restricted to the embodiments, wherein is shown in.

DETAILED DESCRIPTION OF THE DRAWINGS

In the drawings, like elements are referred to with equal reference numerals. The drawings are merely schematic representations, not intended to portray specific parameters of the disclosure. Moreover, the drawings are intended to depict only typical embodiments of the disclosure and therefore should not be considered as limiting the scope of the invention.

Figure 1:
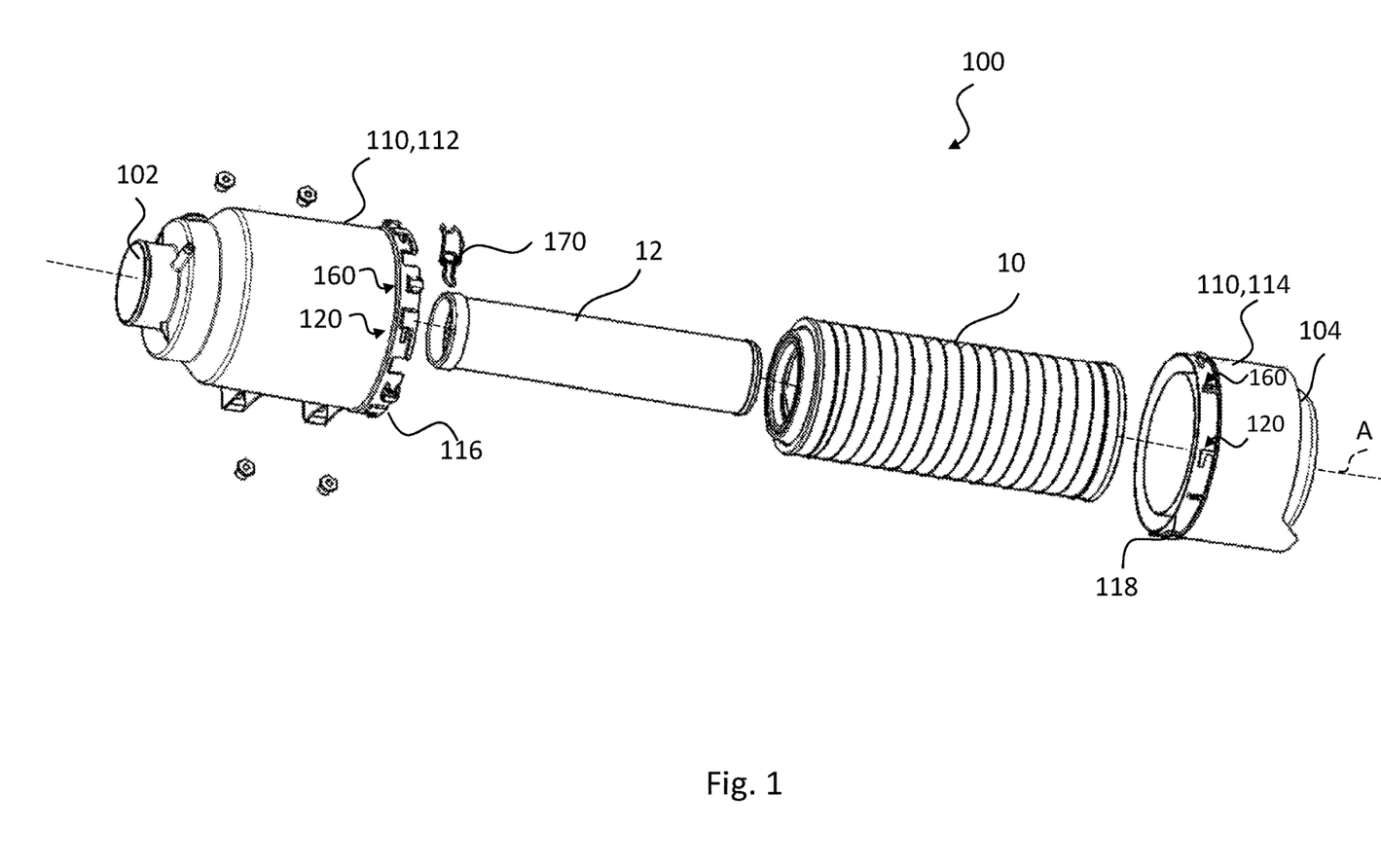
FIG. 1 in an exploded view a filter system according to an embodiment of the disclosure.
Figure 2:
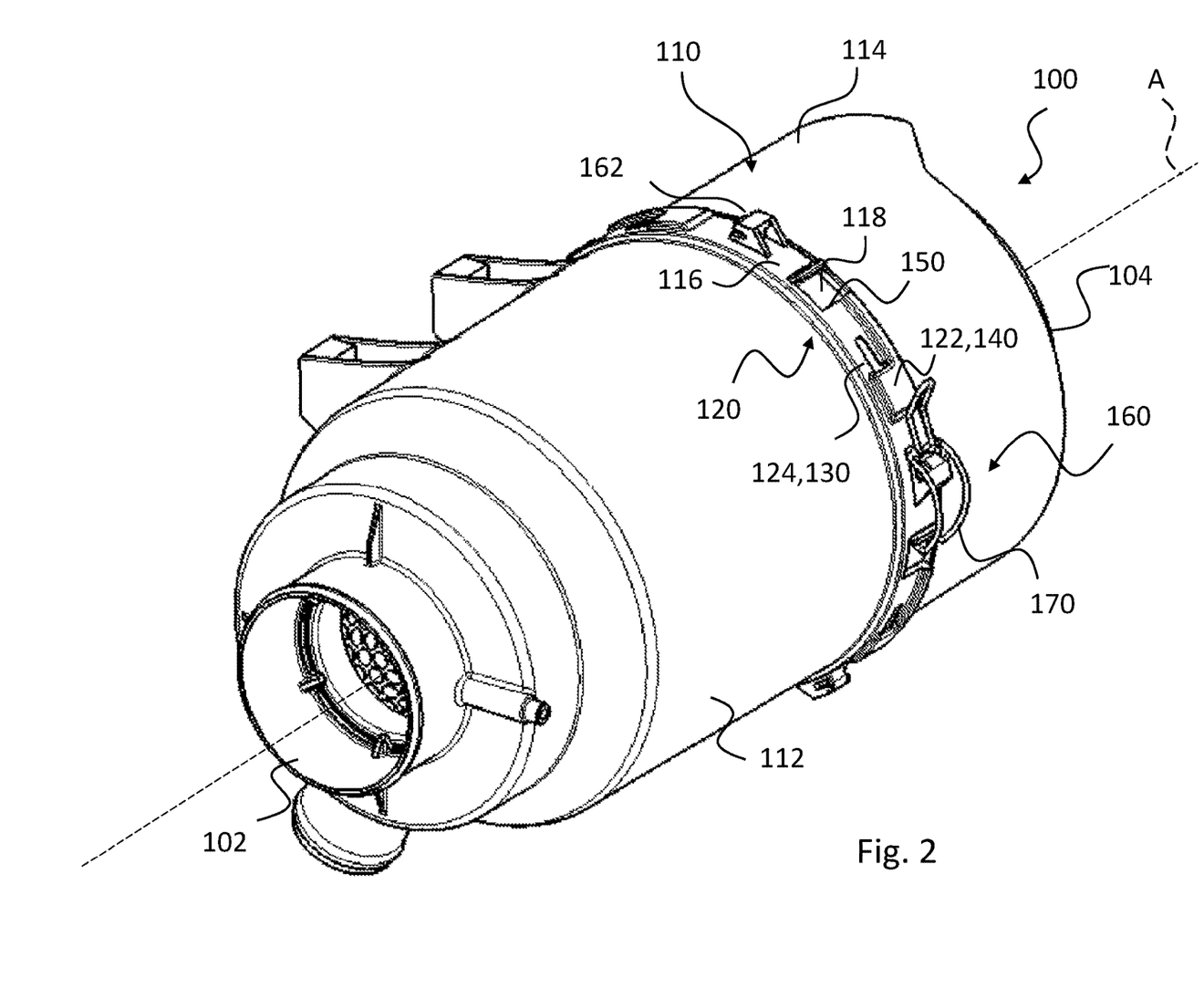
FIG. 2 an isometric view of the filter system of FIG. 1 with a closed housing seen from an outlet side.
Figure 3:
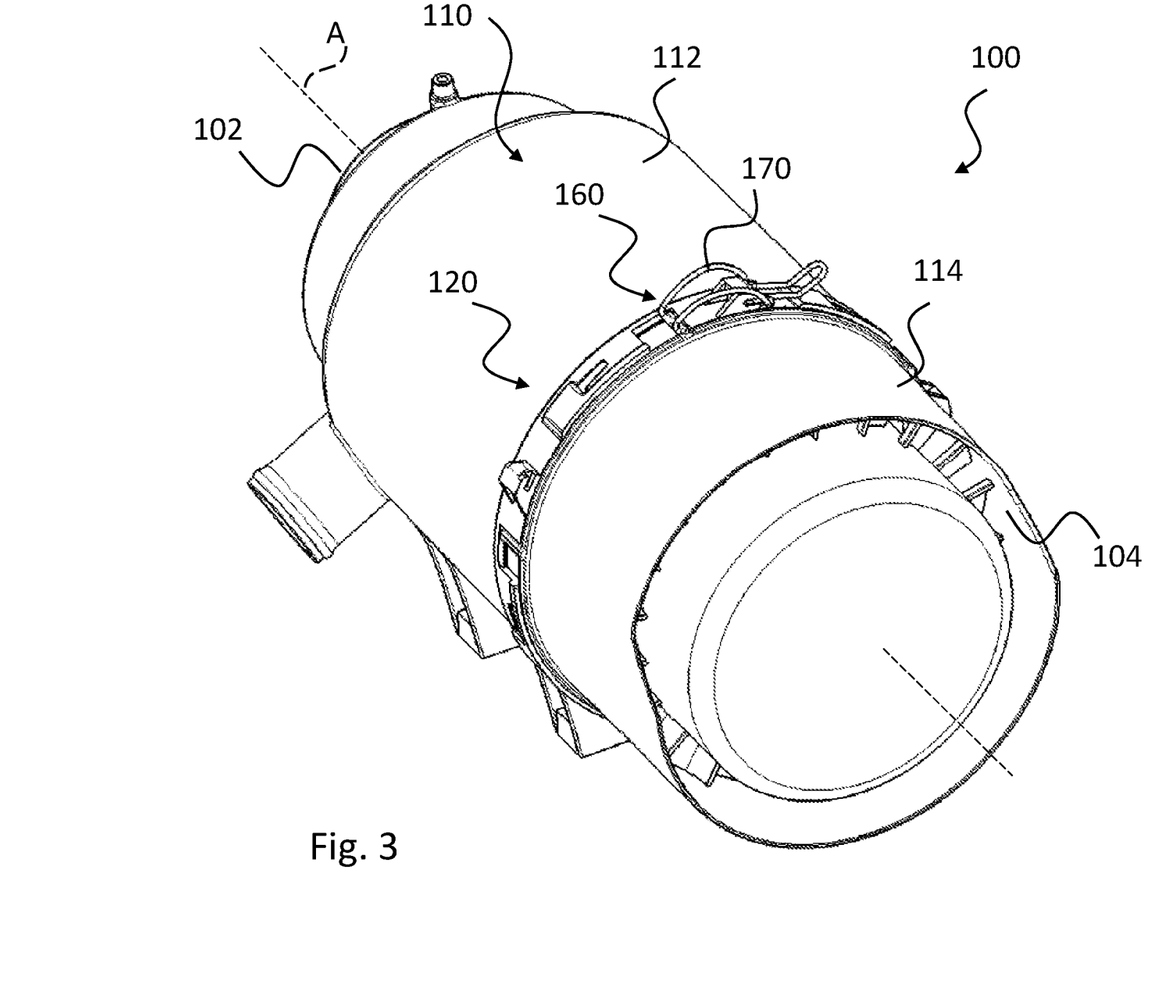
FIG. 3 an isometric view of the filter system of FIG. 1 seen from an inlet side.
Figure 4:
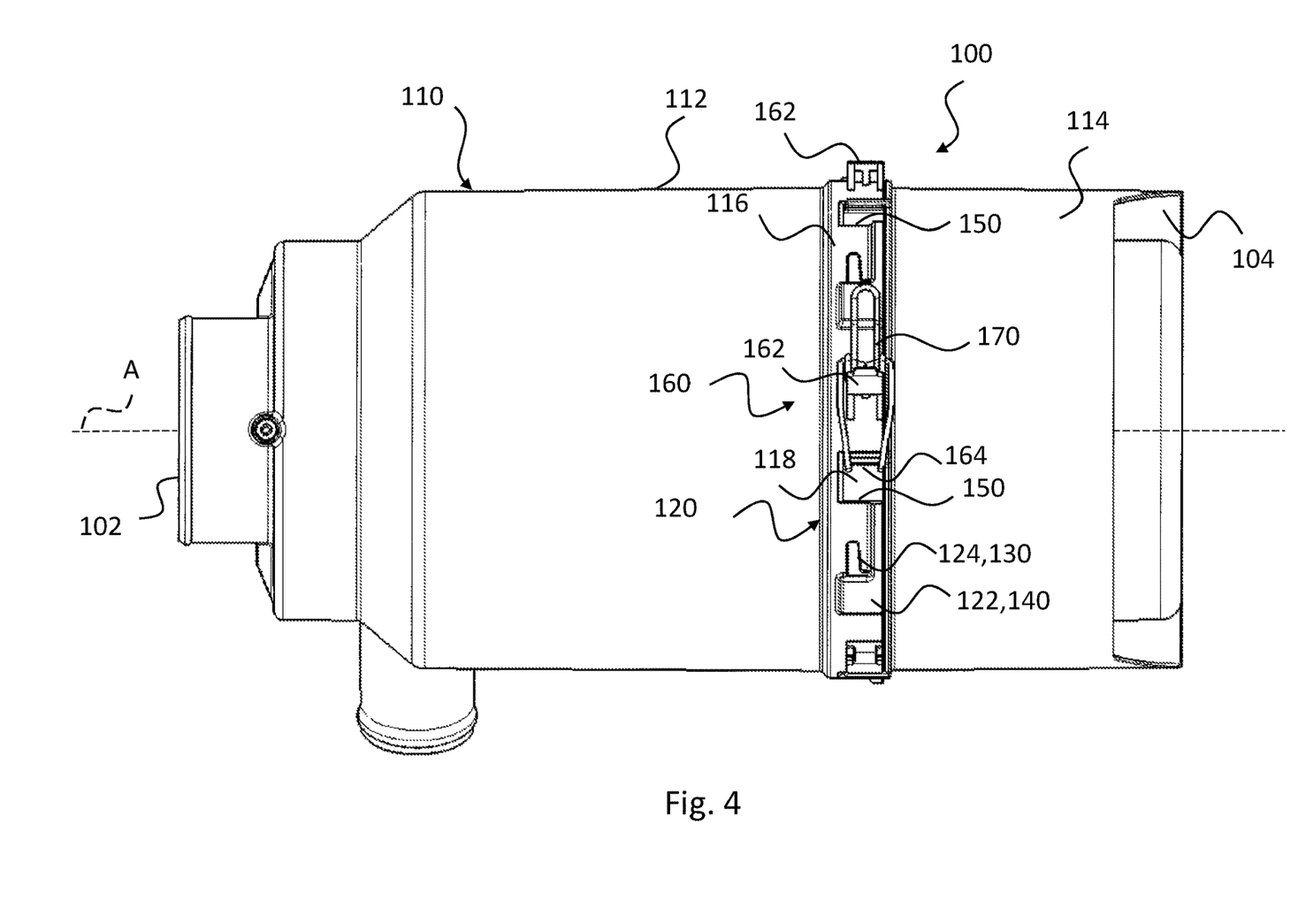
FIG. 4 an isometric side view of the filter system of FIG. 1 with a closed housing.

FIG. 1 depicts in an exploded view the filter system 100 comprising a housing 110 according to an embodiment of the disclosure, the housing 110 having a fluid outlet 102 and a fluid inlet 104. FIGS. 2 to 4 depict various isometric views of the housing 110 seen from the fluid outlet 102 (FIG. 2), from the fluid inlet 104 (FIG. 3) and in a side view (FIG. 4). In the following FIGS. 1 to 4 are described collectively.

The housing 110 of the filter system 100 is provided for receiving a filter element 10 for filtering of a fluid. The housing 110 has a predominantly cylindrical shape. Along a longitudinal axis A the housing 110 comprises a housing body 112 and a mating housing cover 114. The fluid outlet 102 for evacuating the filtered fluid from the housing 110 is arranged in the housing body 112, whereas the fluid inlet 104 for feeding the raw fluid into the housing 110 is arranged in the housing cover 114. For instance, the housing 110 has a coaxially arranged fluid inlet 104 at the end face of the housing cover 114. The fluid outlet 102 is arranged in the front face of the housing body 112. Other arrangements of the fluid inlet 104, as well as the fluid outlet 102, are possible, of course.

Inside the housing, a filter element 10 surrounding a tubular support 12 is arranged. The fluid flow direction through the filter element 10 is radial, so that the raw unfiltered fluid enters the filter element 10 through its outer shell and the clean fluid is evacuated from the filter element 10 through its front end (seen on the left side of the filter element 10 in FIG. 1). The opposing front end is provided with a closed end plate or the like.

The housing body 112 and the mating housing cover 114 are connected to each other by way of a push-twist mount, in particular a bayonet-type mount. A push-twist structure 120 has mating push-twist elements 122, 124 on the housing body 112 and the housing cover 114. In this example embodiment, the housing body 112 is the outer component at the interface of housing body 112 and housing cover 114 and the housing cover 114 is the inner component. For instance, push-twist elements 122 on the housing body 112 are configured as catching receptacles 140 and push-twist elements 124 on the housing cover 114 are configured as catching detents 130.

For securing the push-twist mount in its closed position in an anti-rotation lock manner, an anti-rotation lock structure 160 is provided. The anti-rotation lock structure 160 provides anchor portions 162 arranged along the circumference of the housing body 112. The anchor portions 162 are protruding from the housing body 112 to the outside, having an inclined side in one circumferential direction and a straight side in a radial direction opposing the inclined side. In the straight side a recess is arranged which receives a part of a clip element 170 provided as a support of the part of the clip element 170. In this embodiment, the anti-rotation lock structure 160 comprises ribs 164 arranged on the housing cover 114 and the anchor portions 162 arranged on the circumference of the housing body 112.

The ribs 164 extend in axial direction and are arranged on the housing cover 114. The ribs 164 are arranged in a distance to the catching detents 130 of the push-twist structure 120 on the circumference of the inner one of the housing body 112 and the housing cover 114. In particular, two or more ribs 164 and catching detents 130 are alternatingly arranged along the circumference of the inner one of the housing body 112 and the housing cover 114.

At the interface of the push-twist mount the housing body 112 provides a rim 116 and the housing cover 114 provides a rim 118. The housing has at least one sequence in circumferential direction of an axial cut-out portion 150 followed by one anchor portion 162 followed by one catching receptacle 140. In particular, at least two sequences of an axial cut-out portion 150 followed by one anchor portion 162 followed by one catching receptacle 140 are provided in circumferential direction For locking the push-twist mount in an anti-rotating lock manner, a single external clip element 170 is sufficient for connecting to any of the anchor portions 162 provided on the circumference of the housing body 112. The clip element 170 can be mounted to the housing 110 on the most convenient, in particular the easiest accessible anchor portion 162 and rib 164.

The clip element 170 and the anchor portions 162 are configured so that the clip element 170 is mountable to the anchor portion 162 in a predominantly circumferential mounting direction.

Figure 5:
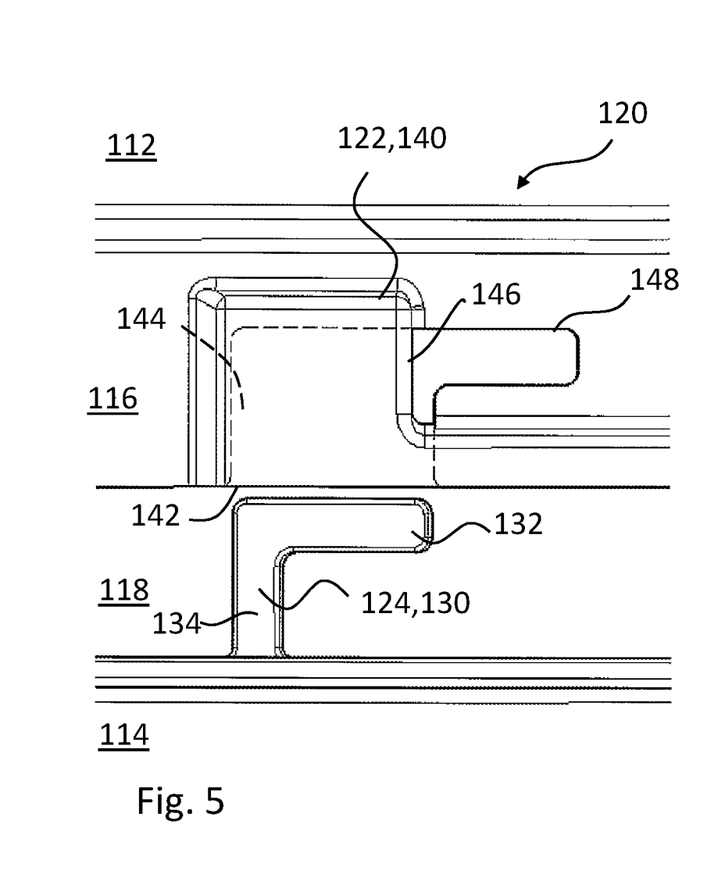
FIG. 5 in a front view a push-twist structure according to an embodiment of the disclosure in an open position.
Figure 6:
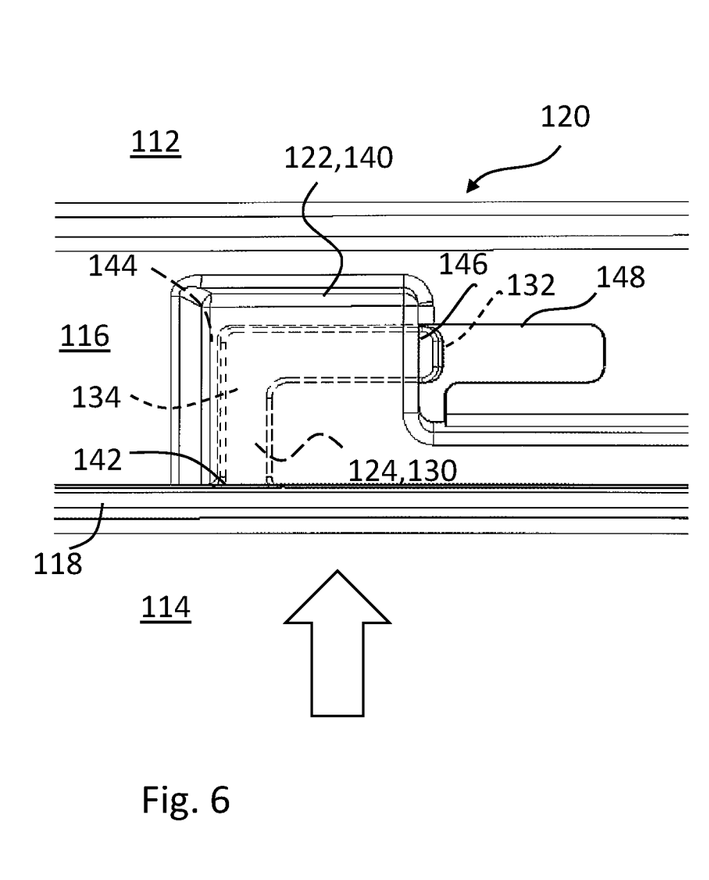
FIG. 6 in a front view a push-twist structure according to FIG. 5 in an intermediate position.
Figure 7:
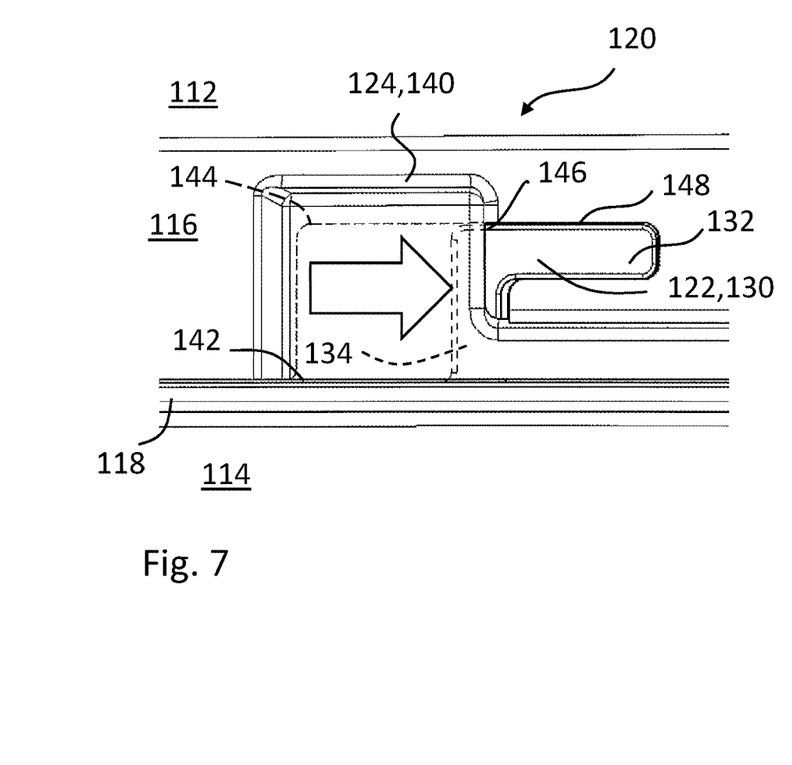
FIG. 7 in a front view a push-twist structure according to FIG. 5 in a closed position.

FIGS. 5 to 7 depict in front views a detail of a push-twist structure 120 according to an embodiment of the disclosure. In the following FIGS. 5 to 7 are described collectively.

FIG. 5 illustrates a situation where the housing body 112 and the housing cover 114 are not yet connected. The rims 116, 118 of the housing body 112 and the housing cover 114 provide a first and a second set of mating push-twist elements 122,124. The rims 116, 118 of the housing body 112 and the housing cover 114 and, hence, the mating push-twist elements 122,124 are pre-aligned so that the second set of push-twist elements 124 can be inserted into the first set of push-twist elements 122 by moving the housing cover 114 axially towards the housing body 112.

The push-twist mount is established and the push-twist structure 120 is in its closed position when the housing body 112 and the housing cover 114 are turned about their longitudinal axis A (FIGS. 1 to 3) relatively to each other. The push-twist structure 120 provides a bayonet-type mount with the first set of push-twist elements 122 configured as catching receptacles 140 and the second set of push-twist elements 124 configured as catching detents 130.

Although only one catching detent 130 and one catching recess 140 are illustrated in the FIGS. 5 to 8 it is to be understood that the push-twist structure 120 may comprise a multitude of catching receptacles 140 and catching detents 130 arranged along the rims 116, 118.

The catching detent 130 is an L-shaped projection configured as an L-shaped hook in this embodiment, having an axially extending leg 134 and a transverse leg 132 pointing in circumferential direction. Other geometries are possible, if desired. The catching detent 130 can easily be manufactured in one piece with the rim 118 of the housing cover 114.

As seen in FIG. 5 the catching detent 130 is placed in line with an opening 142 at the bottom at the axial front end of a catching receptacle 140 arranged at the rim 116 of the housing body 112. The catching receptacle 140 is configured as a notch 144 which protrudes in radial direction from the housing body 112. The catching receptacle 140 provides an opening 146 at its side for the transverse leg 132 of the catching detent 130. Adjoining the opening 146 at the side of the catching receptacle 140 a cut-out portion 148 is arranged in the rim 118 corresponding to the transverse leg 132 of the catching detent 130.

The opening 142 is broad enough to let the catching detent 130 pass in axial direction. The axial movement is indicated in FIG. 6 by a bold arrow pointing upwards.

As can be seen in FIG. 7, the transverse leg 132 is inserted into the cut-out portion 148 in the rim 116 by rotating the housing cover 114 with respect to the housing body 112. When the axial leg 134 finally abuts on the side of the catching receptacle 140 comprising the opening 146 the housing 110 is closed and the push-twist mount established.

When the push-twist mount of the push-twist structure 120 is fully established, the anti-rotation lock structure 160 can be established by mounting a clip element 170 to one of the anchor portions 162 in order to secure the housing 110 in an anti-rotation lock manner.

Figure 8:
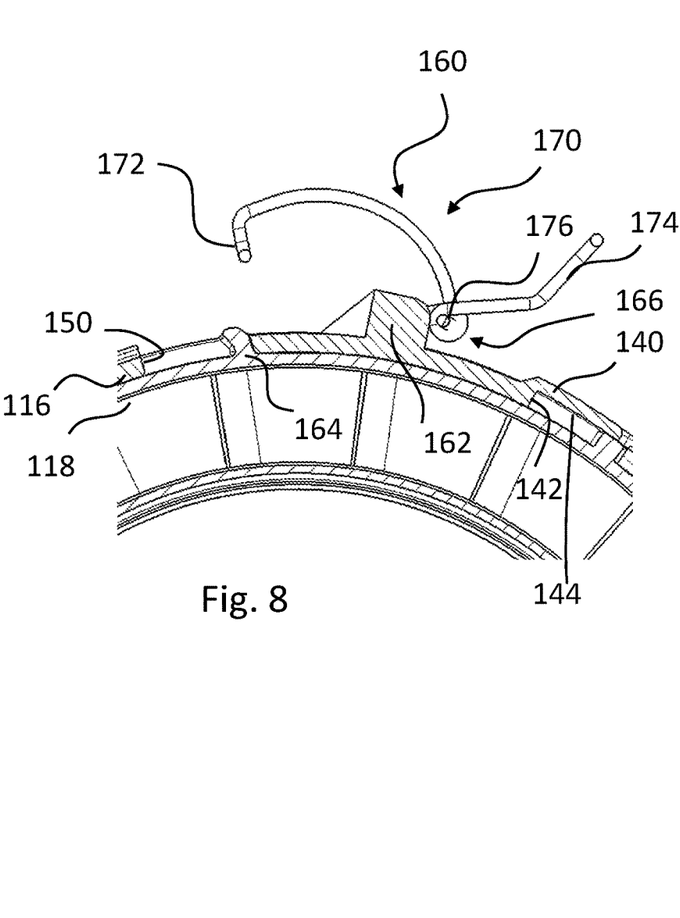
FIG. 8 in a cut view the anti-rotation lock structure in an intermediate position according to an embodiment of the disclosure.
Figures 9, 10:
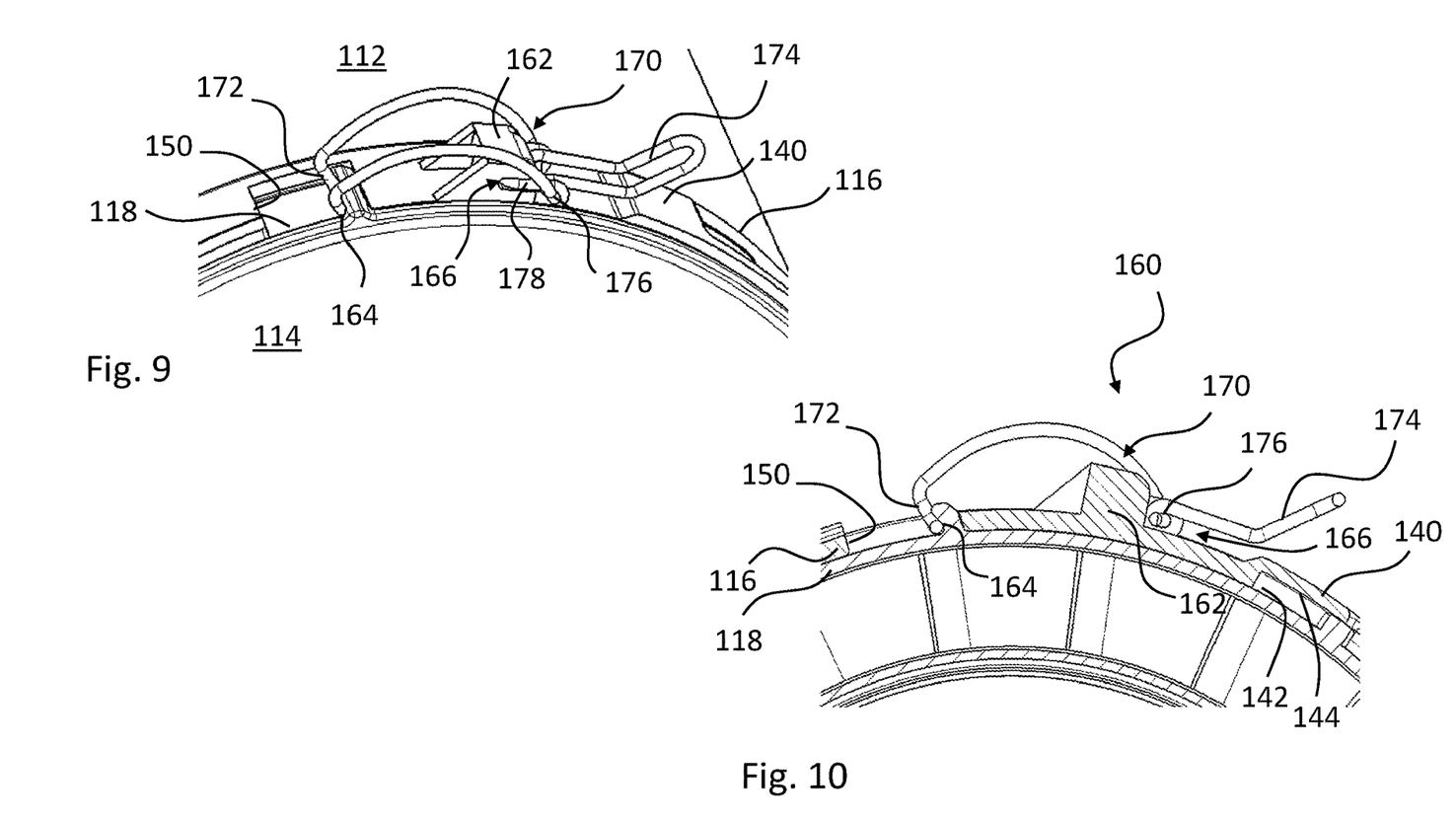
FIG. 9 in an isometric top view the anti-rotation lock structure according to FIG. 8 in a closed position.
FIG. 10 in a cut view the anti-rotation lock structure according to FIG. 8 in the closed position.

FIGS. 8 to 10 illustrate the anti-rotation lock structure 160 in more detail. FIG. 8 depicts in a cut view the anti-rotation lock structure 160 in an intermediate position according to an embodiment of the disclosure. FIG. 9 illustrates in an isometric top view the anti-rotation lock structure 160 according to FIG. 8 in a closed position. FIG. 10 illustrates in a cut view the anti-rotation lock structure 160 according to FIG. 8 in its closed position. In the following FIGS. 8 to 10 are described collectively.

The anchor portion 162 may be made in one piece with the surface shell of the housing body 112 by a plastic mold process or the like. The anchor portion 162 is arranged on the rim 116 of the housing body 112 which is the outer element of housing body 112 and housing cover 114. For establishing the closed position of the anti-rotation lock structure 160 a separate external clip element 170 is provided. The clip element 170 may be a conventional clip well known in the art which comprises a lever portion 174 for negotiating with the anchor portion 162 and a catching portion 172 for negotiating with a rib 164, where the catching portion 172 is connected to the lever portion 174 by way of a joint 176 and the lever portion 174 comprises a short inner end section 178 which is to be inserted in a recess 166 of the anchor portion 162 for tightening the clip element 170. The rib 164 may be tilted away from the anchor portion 162 thus improving the grip of the catching portion 172 to the rib 164.

The catching portion 172 of the clip element 170 is attached to the rib 164 on the rim 118 of the housing cover 114. The rib 164 is accessible through the cut-out portion 150 in the rim 116 of the housing body 112. The short inner end section 178 of the lever portion 174 is close to the joint 176 and serves as a lever arm. The longer section or the lever portion 174 serves as a handle. The short inner end section 178 is accommodated in the recess 166 of the anchor portion 162 and is supported by the bottom of the recess 166 of the anchor portion 162. By pushing the lever portion 174 against the rim 116 of the housing body 112, the catching portion 172 clamps the rib 164 against the side of the cut-out portion 150 which is close to the anchor portion 162. Thus, the clip element 170 can be comfortably opened and closed by one hand.

The invention claimed is:

1. A housing for receiving a filter element for filtering of a fluid, comprising along a longitudinal axis (A)
    a housing body;
    a mating housing cover, wherein the housing body and the mating housing cover are arranged axially on the longitudinal axis (A);
    wherein a push-twist structure is provided for connecting the housing body and the housing cover by way of a push-twist mount, the push-twist structure having mating push-twist elements on the housing body and the housing cover;
    wherein the housing cover has a circumferential rim formed on a circumferential outer surface of the housing cover;
    wherein the housing body has a circumferential rim formed on a circumferential outer surface of the housing body;
    wherein a first rim of the circumferential rims has the push-twist element formed as L-shaped radial projections on a radially outer surface of the first rim, the L-shaped projections having:
        an axially extending axial leg arranged on the radially outer surface of the first rim; and
        a traverse leg arranged on the radially outer surface of the first rim and extending in the circumferential direction on the first rim,
        wherein an end of the traverse leg is directly connected to the axially extending axial leg, forming the "L-shape" of the L-shaped radial projections; and
    wherein a second rim of the circumferential rims has at least one catching receptacle formed as a notch on a radially inner side of the second rim;
    wherein the first rim closes a radially inner side of the notch and the second rim closes a radially outer side of the notch, forming the catching receptacle as a pocket between the first and second rims;
    wherein the catching receptacle has a receiving opening sized to receive a respective one of the L-shaped projections into an interior of the at least one catching receptacle;
    wherein an engagement opening is formed in a sidewall of the at least one catching receptacle;
    wherein the receiving opening is sized to receive a respective one of the L-shaped projections into an interior of the catching receptacle;
    wherein the engagement opening of the catching receptacle is sized to receive and then engage against the traverse leg of the L-shaped projections when the housing body and the mating housing cover are rotated about the longitudinal axis (A) relative to each other, the engagement of the traverse leg into the engagement opening mounting the housing body onto the mating housing cover; and
    wherein an anti-rotation lock structure is provided for securing the push-twist structure in its closed position in an anti-rotation lock manner;
    wherein the anti-rotation lock structure provides at least one anchor portion arranged along the circumference of the outer one of the housing body and the housing cover;
    wherein a clip element is provided for connecting to the anchor portion; and
    wherein the clip element and the anchor portions are configured so that the clip element is to be mounted to the anchor portion in a predominantly circumferential mounting direction.

2. The housing according to claim 1, wherein
    the transverse leg protrudes through the engagement opening in the circumferential direction when the push-twist structure is in its locked state.

3. The housing according to claim 1, wherein
    the anti-rotation lock structure comprises
        at least one rib extending in axial direction and being arranged on the rim of a radially inner one of the housing body and the housing cover,
        the at least one rib being arranged in a distance to the at least one L-shaped projections of the push-twist structure on the circumference of the inner one of the housing body and the housing cover.

4. The housing according to claim 3, wherein
    two or more ribs and L-shaped projections are alternatingly arranged along the circumference of the inner one of the housing body and the housing cover.

5. The housing according to claim 3, wherein
    the clip element is provided with a catching portion contacting against the at least one rib of the anti-rotation lock structure and a lever portion for engaging against one of the anchor portions of the anti-rotation lock structure.

6. The housing according to claim 1, wherein
    one of the rims of the outer one of the housing body and the housing cover provides at least one sequence in circumferential direction of an axial cut-out portion (150) followed by one anchor portion followed by one catching receptacle.

7. The housing according to claim 6, wherein
    at least two sequences of an axial cut-out portion followed by one anchor portion followed by one catching receptacle are provided in circumferential direction.

8. The housing according to claim 1, wherein
    the anchor portion is made in one piece with the surface shell of the outer one of the housing body and the housing cover.

9. A filter system having
    a housing,
    the housing being configured for receiving a filter element (10) for filtering of a fluid, comprising along a longitudinal axis (A)
        a housing body;
        a mating housing cover;
        a fluid outlet for evacuating the filtered fluid from the housing;
        a fluid inlet for feeding the raw fluid into the housing;
    wherein a push-twist structure is provided for connecting the housing body and the housing cover by way of a push-twist mount, the push-twist structure having mating push-twist elements on the housing body and the housing cover;

wherein the housing cover has a circumferential rim formed on a circumferential outer surface of the housing cover;

wherein the housing body has a circumferential rim formed on a circumferential outer surface of the housing body;

wherein a first rim of the circumferential rims has the push-twist element formed as L-shaped radial projections on a radially outer surface of the first rim, the L-shaped projections having:

an axially extending axial leg arranged on the radially outer surface of the first rim; and     a traverse leg arranged on the radially outer surface of the first rim and extending in the circumferential direction on the first rim,     wherein an end of the traverse leg is directly connected to the axially extending axial leg, forming the "L-shape" of the L-shaped radial projections; and wherein a second rim of the circumferential rims has at least one catching receptacle formed as a notch on a radially inner side of the second rim;

wherein the first rim closes a radially inner side of the notch and the second rim closes a radially outer side of the notch, forming the catching receptacle as a pocket between the first and second rims;

wherein the catching receptacle has a receiving opening sized to receive a respective one of the L-shaped projections into an interior of the at least one catching receptacle;

wherein an engagement opening is formed in a sidewall of the at least one catching receptacle;

wherein the receiving opening is sized to receive a respective one of the L-shaped projections into an interior of the catching receptacle;

wherein the engagement opening of the catching receptacle is sized to receive and then engage against the traverse leg of the L-shaped projections when the housing body and the mating housing cover are rotated about the longitudinal axis (A) relative to each other, the engagement of the traverse leg into the engagement opening mounting the housing body onto the mating housing cover; and wherein an anti-rotation lock structure is provided for securing the push-twist structure in its closed position in an anti-rotation lock manner;

wherein the anti-rotation lock structure provides at least one anchor portion arranged along the circumference of the outer one of the housing body and the housing cover;

wherein a clip element is provided for connecting to the anchor portion; and wherein the clip element and the anchor portions are configured so that the clip element is to be mounted to the anchor portion in a predominantly circumferential mounting direction.

10. The filter system according to claim 9, wherein the fluid inlet is accommodated in the housing cover.

11. The filter system according to claim 9, wherein the fluid outlet is accommodated in the housing body.

\* \* \* \* \*